March 31, 1959 — E. L. MLECZKO — 2,879,668
UNIVERSALLY MOUNTED GYRO
Filed Jan. 19, 1956 — 3 Sheets-Sheet 1

INVENTOR.
EUGENE L. MLECZKO
BY
ATTORNEY.

March 31, 1959  E. L. MLECZKO  2,879,668
UNIVERSALLY MOUNTED GYRO
Filed Jan. 19, 1956  3 Sheets-Sheet 2

INVENTOR.
EUGENE L. MLECZKO
BY
ATTORNEY

March 31, 1959 E. L. MLECZKO 2,879,668
UNIVERSALLY MOUNTED GYRO
Filed Jan. 19, 1956 3 Sheets-Sheet 3

INVENTOR.
EUGENE L. MLECZKO
BY
ATTORNEY.

United States Patent Office 2,879,668
Patented Mar. 31, 1959

2,879,668

UNIVERSALLY MOUNTED GYRO

Eugene L. Mleczko, Covina, Calif., assignor to Aerojet-General Corporation, Azusa, Calif., a corporation of Ohio Application January 19, 1956, Serial No. 560,926

10 Claims. (Cl. 74—5.4)

This invention relates to the precession of gyros and has for its object to enable a gyro to be precessed in a predetermined manner.

Precessed gyros have heretofore been used in object or target detecting systems. For the purpose of locating such objects or targets in space provision has been made for causing an axis of the gyro to move in relation to an area in which the target is to be searched.

In accordance with my present invention, I provide a system for producing a desired precession pattern for a gyro. I carry out the invention by provision of a magnet on the gyro and a plurality of coils located at different angular positions around the gyro. The magnet on the gyro, rotating in relation to the coils, induces voltages in the respective coils which are out of phase with each other owing to their different angular positions. This is in effect a plural or a multiphase generator; and its output is applied to a phase-shifting device. The output of the phase-shifting device is brought to a control coil also related to the gyro which has the effect of precessing the gyro. In consequence, the gyro precession is dependent on the phase and amplitude of the voltage in the control coil.

A feature of the invention resides in suitably varying this phase and amplitude relationship, so that a desired pattern or programming of the gyro precession can be obtained.

The foregoing and other features of the invention will be better understood from the following detailed description and the accompanying drawing, of which:

Figure 2:
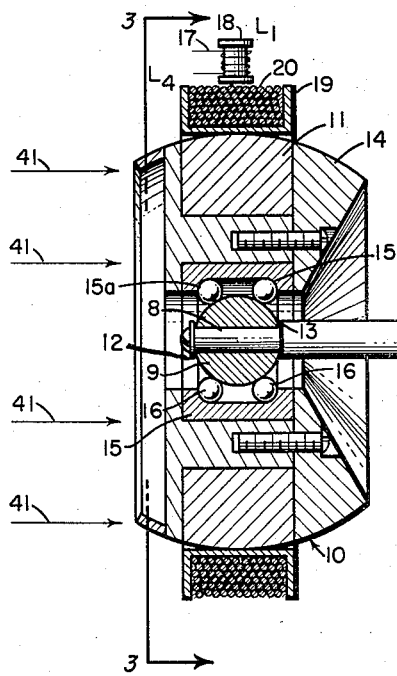
Fig. 2 shows a cross-section view of a gyro taken at line 2—2 of Fig. 3, which can be used in the system of Fig. 1.
Figure 3:
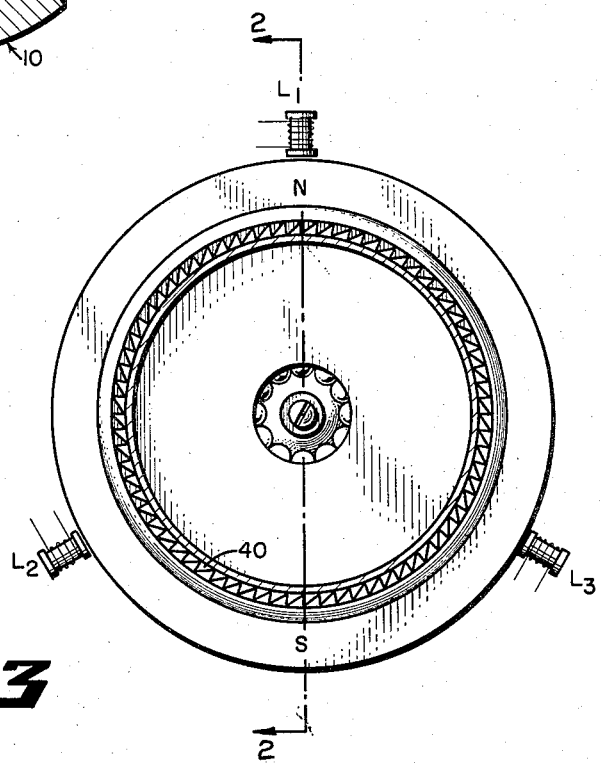
Fig. 3 shows a cross-section view of the gyro taken at line 3—3 of Fig. 2.

Referring to the drawings, there is shown a gyro 10 indicated schematically by a ring magnet 11 having oppositely located north and south poles marked "N" and "S" as shown. The gyro may be constructed as shown in Figs. 2 and 3, although it should be understood that other forms of gyro could be used instead. In Fig. 2 the gyro 10 is shown mounted on a ball 9 held on an axial pin 8 which passes through a diameter of the ball; a screw and washer 12 serving to hold the ball against the shoulder of an enlarged section 13 of the pin. The gyro rotor member 14 has an outer periphery in the form of a surface of revolution, and is mounted on the ball 9 in such a manner that the gyro rotor is free to turn in any direction on the ball within the limits of movement permitted by the construction. For this purpose there is provided on the inner periphery of the gyro rotor member 14 a cylindrical ball race 15 having rounded annular walls 15a and 15b, spaced at the proper distance from the universal ball 9 to hold a series of smaller balls 16, thus providing a ball bearing universal arrangement for the gyro. The gyro rotor member 14 has formed around its periphery an annular slot of the proper shape and size to receive the annular ring magnet 11 which may be of a suitable magnetic material such as an alloy of nickel, iron and aluminum sold under the trade name of "Alnico VI."

The gyro rotor may be rotated by any suitable means (not shown), such as for example, a motor winding wound on the rotor, or an air impeller or the like.

Spaced around the circumference of the magnet on the rotor are three coils $L_1$, $L_2$ and $L_3$ spaced equidistant, that is 120° apart. Each of these coils comprises an electrical conductor 17 wound on a bobbin 18. A fourth coil $L_4$ is wound in the form of an annulus circumferentially around, and somewhat spaced from, the magnet of the rotor. This comprises a cylindrical form 19 on which is wound the conductor 20 of the coil.

The coils $L_1$, $L_2$ and $L_3$ are in effect Y-connected three-phase generator coils whose voltage is generated by the rotating magnet. The output of these three coils is connected over leads 21, 22 and 23 to the delta-connected stator coils $S_1$, $S_2$ and $S_3$ of a transformer T having a variable rotor coil $R_1$ related to the stator coils.

The output of the rotor $R_1$ is connected to a potentiometer system which comprises a potentiometer $P_1$ connected across coil $R_1$, a second potentiometer $P_2$ connected from one side of potentiometer $P_1$ to the arm 24 of potentiometer $P_1$, and the third potentiometer $P_3$ connected from one side of potentiometer $P_2$ to the arm 25 of potentiometer $P_2$.

The output of the potentiometer $P_3$ is carried over the line 27 to the input of an amplifier 28, the output of which is carried to the coil $L_4$.

For the purpose of turning the rotor $R_1$ and also simultaneously moving the movable contactors on the potentiometers there is provided a motor 29. The motor shaft is connected by a mechanical coupling or linkage indicated by the dotted lines 30, to a clutch 31 which is indicated as a slipping clutch. The driven side of this clutch is connected by another mechanical linkage indicated by the dotted lines 32, to the rotor $R_1$. By this arrangement the motor 29 turns the rotor through the clutch; but the angularity of the rotor can always be adjusted by hand due to the slipping feature of the clutch. There is indicated for this purpose, an adjusting knob 33 attached to the linkage member. The rotor $R_1$ is also linked by a mechanical linkage represented by dotted lines 34 to the arm 24 of the potentiometer $P_1$, so that the potentiometer arms move on the potentiometers while the rotor is rotating. This linkage 34 may be disconnected from the potentiometer arm when desired.

The shaft of the motor 29 also has attached to it a clutch 35, which when engaged drives a cam 36 on a shaft 37 by a suitable mechanical linkage 38. The cam rider 39 is connected by a suitable mechanical arm or linkage represented by dotted line 42 to the arm 26 of potentiometer $P_3$. The clutch 35 is indicated as being of the solenoid-operated type, in that its engagement and disengagement is effected by a solenoid 43 which operates the clutch by a linkage represented by dotted line 44.

Figure 1:
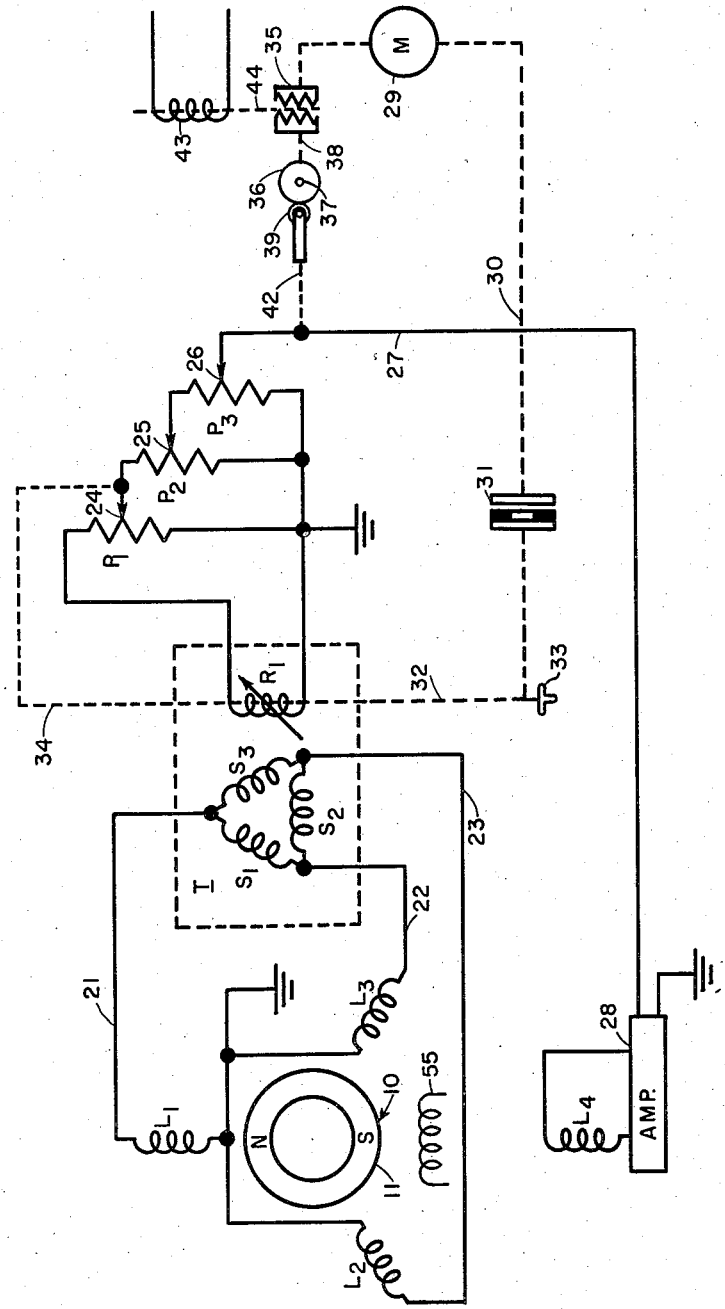
Fig. 1 shows a system in accordance with this invention.

The device operates as follows: A pulse of current flowing in the coil $L_4$ will cause the gyro to precess by reason of the action of the magnetic field of coil $L_4$ on the magnet of the gyro, and the precession will occur in the direction which is 90° to the direction of pull on the gyro from the coil $L_4$. Such pulses are produced from the voltage induced in coils $L_1$, $L_2$ and $L_3$ by the rotating magnet, these induced voltages being in combination essentially the output of a three-phase generator, These generator voltages applied to the stator windings $S_1$, $S_2$ and $S_3$ of the control transformer produce a rotating magnetic field within it, which in turn induces a voltage in the rotor coil $R_1$, whose phase is a function of the physical position of the rotor $R_1$ with relation to the transformer windings $S_1$, $S_2$ and $S_3$. Thus, the precession of the gyro occurs in a direction and to a position determined by the phase and amplitude of the applied voltage on coil $L_4$ through the amplifier from the rotor $R_1$. Furthermore, in the presence of a restoring force on the gyro, the gyro would stay precessed in that position as long as the signal remained on coil $L_4$. The restoring force on the gyro, that is, the force tending to return the gyro to its unprecessed position can be supplied in any desired manner, for example, by the application of a constant magnetic field as from a current carrying coil indicated schematically as coil 55 in Fig. 1, which will tend to keep the gyro axis in its normal position and tend to restore it to the normal position if precessed out of normal. The manner in which the restoring force is applied in the arrangement shown in Figs. 2 and 3 is by application of a stream of air, in the direction in which the gyro axis is normally directed, against air impeller blades 40; which serve to rotate the gyro when a blast of air is directed against them in the direction of arrows 41 (Fig. 2). These air impeller blades are so constructed that when the gyro is precessed from its normal position the air force becomes greater on the precessed side which tends to restore the gyro.

Figure 4:
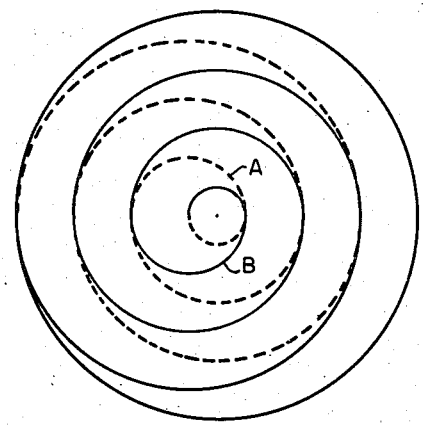
Fig. 4 shows graphically a path which can be described by the gyro axis during precession.

If the amplitude or phase of the voltage at coil $R_1$ be changed, the gyro position will change in correspondence. The phase can be changed by changing the angular position of coil $R_1$, and the amplitude can be changed by varying the movable arms of the potentiometers $P_1$, $P_2$ and $P_3$. By varying the amplitude and phase in a prescribed manner, the gyro will follow the dictates of the changing signal in coil $L_4$ and produce a corresponding pattern. For example, if it is desired that the axis of the gyro move out from center and then return to center in a spiral path somewhat as shown in Fig. 4, the phase should be varied continuously while the amplitude of the signal is slowly increased; that is, for every increment of time, the phase should shift slightly and the amplitude should increase slightly. In Fig. 4, the spiral lines A and B are the paths taken by the projection of the gyro axis on a plane surface as the gyro axis precesses through an angular rotation. At the completion of the outward spiral the phase should continue to shift the same amount in the same direction per increment of time, while the amplitude is slowly reduced. This can be achieved by the driving of the rotor of the control transformer with the motor 29 at a uniform rate, while the linkage 34 to potentiometer $P_1$ is disconnected. The mechanical linkage 42 causes potentiometer $P_3$ to increase the amplitude of the signal impressed on the amplifier to a maximum and then slowly decrease the amplitude to a minimum. This is simply done by the running of the arm of the potentiometer back and forth in the corresponding manner by action of the cam 36, as shown in Fig. 5.

Figure 5:
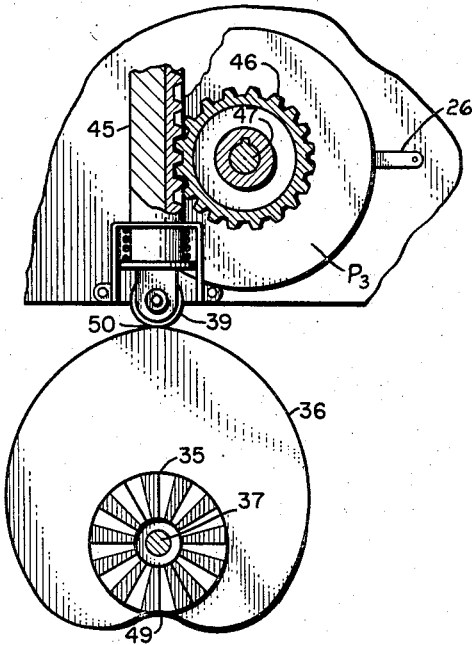
Fig. 5 shows a cam arrangement which can be used to produce the pattern of Fig. 4.

Fig. 5 shows the cam 36 in the general form of a heart, with the cam rider 39 on its periphery. The cam rider is mounted to a spring loaded rack 45 having teeth which engage the teeth of a pinion 46 fastened to a shaft 47 to which is also fastened the wiper arm 26 of potentiometer $P_3$. In this arrangement elements 45, 46 and 47 correspond with the mechanical linkage represented by dotted lines 42 in Fig. 1. At position 49 of the cam, the follower 39 is at a minimum distance from the shaft 37; and at position 50 of the cam the follower is at a maximum distance from the shaft. Thus as the cam rotates, the follower 39 acting through the rack and pinion rotates the potentiometer wiper from a position of minimum resistance to a position of maximum resistance and back to a minimum again. The combined effect of the rotation of the control transformer rotor and the variation of the resistance of potentiometer $P_3$ causes the phase and amplitude of the signal applied to the precession coil $L_4$ to vary in such a way as to produce this desired spiral pattern.

In this operation the potentiometers $P_1$ and $P_2$ can be used to adjust the over-all size of the pattern, by manually adjusting their settings at desired positions and leaving them there.

In the event that an oblong pattern or a square or triangular-shaped pattern is desired, this can be accomplished by coupling the arm of potentiometer $P_1$ to the phase-shifting rotor by the linkage 34; and will result in the desired pattern if the resistance of the potentiometer $P_1$ is properly proportioned for the pattern desired. In this operation potentiometers $P_1$ and $P_3$ are moving with the rotor while potentiometer $P_2$ is manually set at some desired position to establish the size of the pattern. This arrangement is useful for patterns having corners.

Various shapes of pattern or path which may be desired can be achieved by the proper selection of electromechanical elements to act upon the phase and amplitude of the signal being applied to the precession coil $L_4$.

It will be recognized that modifications may be made within the scope of this invention without departing therefrom. For example, some other number of phases than the three-phase signal pickup system may be used. Again, some other form of phase-shift device than the phase-shifting control transformer may be used. The invention is not limited except in accordance with the scope of the appended claims.

I claim:

1. Mechanism for precessing from a normal position the axis of a gyro mounted for rotation on a universal mounting, comprising an annular magnet having opposite north and south poles and concentric with the axis of rotation of the gyro, a plurality of coils at spaced angular positions around the magnet so that the rotating magnet induces voltage in the coils, a variable phase-shifting means, means connecting the output of the coils to the phase-shifting means, voltage-amplitude-varying means connected to the output of the phase-shifting means, a precession coil located in proximity to the gyro magnet so that voltage on the precession coil precesses the gyro, means tending to restore the axis of the gyro to its normal position, the output of the voltage-amplitude-varying means being connected to the precession coil for impressing the output of the phase shifting means on the precession coil, whereby the gyro precesses in accordance with the variation of phase and amplitude of the voltage impressed on the precession controlling coil to produce a corresponding precession pattern of the gyro.

2. Mechanism according to claim 1 in which the voltage-amplitude-varying means comprises a potentiometer.

3. Mechanism according to claim 1 in which the precession coil is an annular coil located concentrically around the magnet.

4. Mechanism for precessing from a normal position the axis of a gyro mounted for rotation on a universal mounting, comprising an annular magnet having opposite north and south poles and mounted on the gyro concentric with the axis of rotation of the gyro, a plurality of voltage pickup coils located at spaced angular positions around the magnet so that the rotating magnet induces voltage in the coils, a variable phase-shifting means connected to the output of said coils, said phase-shifting means comprising a stator coil and a rotor coil, a potentiometer means connected to the output of the phase-shifting means, a precession coil located in proximity to the gyro magnet so that voltage on the precession coil precesses the gyro, means tending to restore the axis of the gyro to its normal position, the output of the potentiometer means being connected across the precession coil, and means for simultaneously driving the rotor and varying the potentiometer so that both the phase and amplitude of the voltage on the precession coil is correspondingly varied.

5. Mechanism according to claim 4 in which the potentiometer means comprises a plurality of potentiometers arranged in tandem with each other.

6. Mechanism for precessing from a normal position the axis of a gyro mounted for rotation on a universal mounting, comprising an annular magnet having opposite north and south poles and mounted on the gyro concentric with the axis of rotation of the gyro, a plurality of voltage pick-up coils located at spaced angular positions around the magnet so that the magnet induces polyphase voltage in the coils, a variable phase-shifting means connected to the output of said coils, said phase-shifting means comprising a stator and a rotor, a potentiometer means connected to the output of the phase-shifting means said potentiometer means comprising a plurality of potentiometers arranged in tandem, a precession coil located in proximity to the gyro magnet so that voltage on the precession coil precesses the gyro, means tending to restore the axis of the gyro to its normal position, the output of the potentiometer means being connected across the precession coil, and a motor drive coupled to said rotor and to the potentiometer means for continuously varying the phase and amplitude of the voltage impressed on the precession coil.

7. Mechanism according to claim 6 in which the motor drive is coupled to a plurality of said tandem-connected potentiometers for establishing the pattern of the precession.

8. Mechanism according to claim 6 in which said potentiometer means comprises three potentiometers arranged in tandem, and the motor drive is coupled to the first and the third of the tandem-connected potentiometers.

9. Mechanism for precessing from a normal position the axis of a gyro mounted for rotation on a universal mounting comprising an annular magnet having opposite north and south poles and concentric with the axis of rotation of the gyro, coil means adjacent the magnet so that the rotating magnet induces voltage in said coil means, a variable phase-shifting means, means connecting the output of the coil means to the phase-shifting means, voltage-amplitude-varying means connected to the output of the phase-shifting means, a precession coil located in proximity to the gyro magnet so that voltage on the precession coil precesses the gyro, means tending to restore the axis of the gyro to its normal position, the output of the voltage-amplitude-varying means being connected to the precession coil for impressing the output of the phase shifting means on the precession coil, whereby the gyro precesses in accordance with the variation of phase and amplitude of the voltage impressed on the precession controlling coil to produce a corresponding precession pattern of the gyro.

10. Mechanism for precessing from a normal position the axis of a gyro mounted for rotation on a universal mounting comprising an annular magnet having opposite north and south poles and mounted on the gyro concentric with the axis of rotation of the gyro, voltage pickup coil means located adjacent the magnet so that the rotating magnet induces voltage in said coil means, a variable phase-shifting means connected to the output of said coil means, said phase-shifting means comprising a stator coil and a rotor coil, a potentiometer means connected to the output of the phase-shifting means, a precession coil located in proximity to the gyro magnet so that voltage on the precession coil precesses the gyro, means tending to restore the axis of the gyro to its normal position, the output of the potentiometer means being connected across the precession coil, and means for simultaneously driving the rotor and varying the potentiometer so that both the phase and amplitude of the voltage on the precession coil is correspondingly varied.

No references cited.